UNITED STATES PATENT OFFICE.

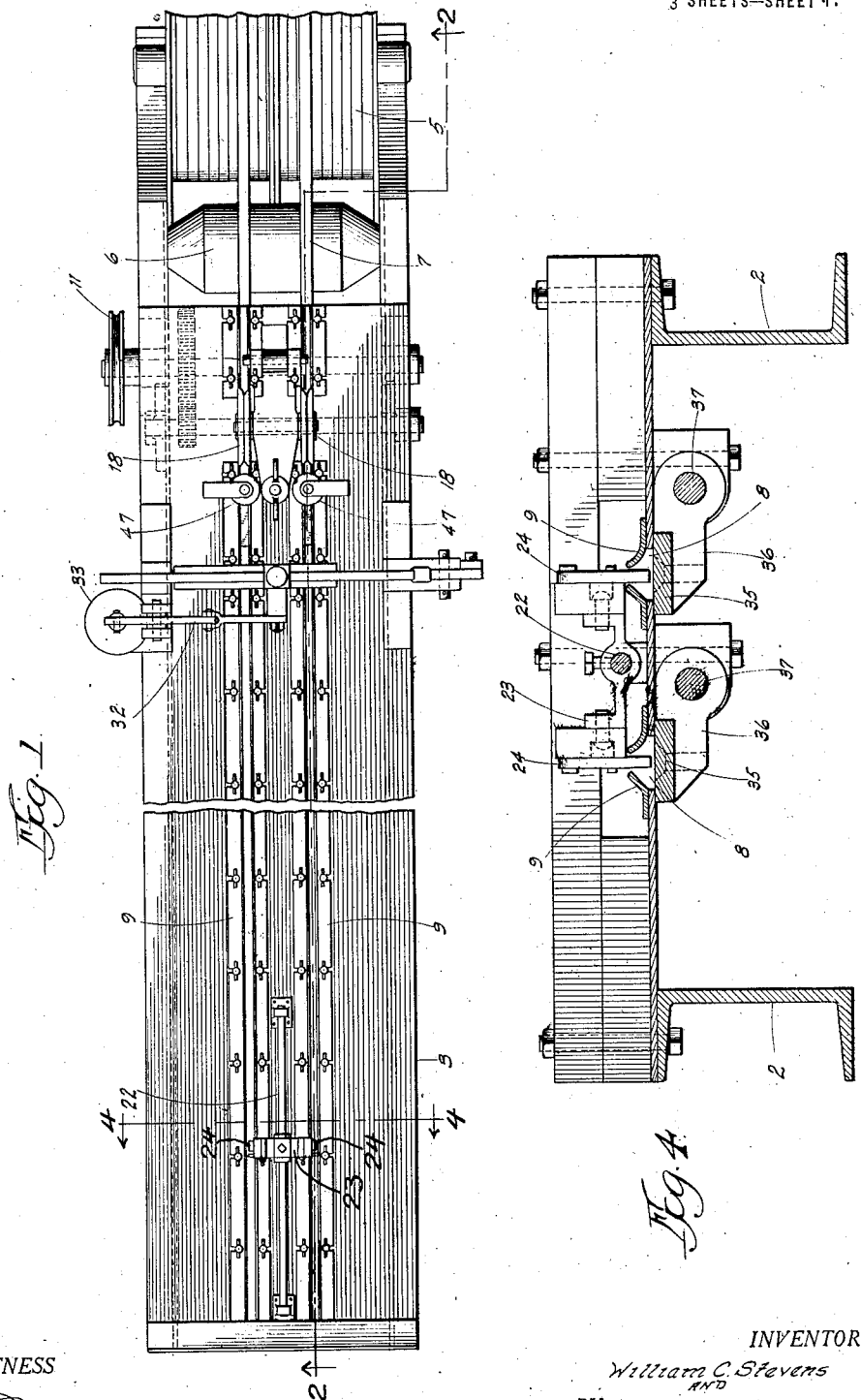

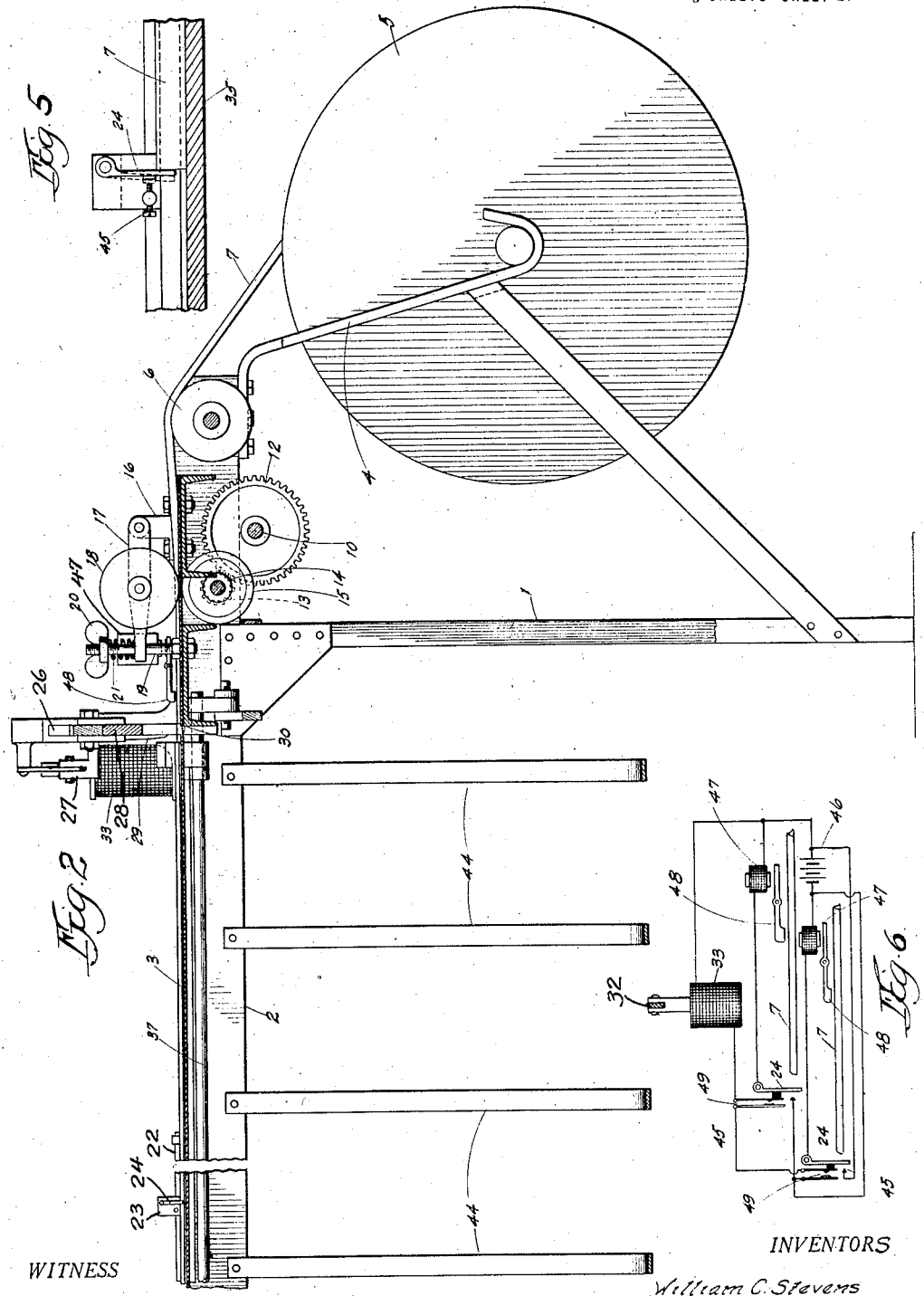

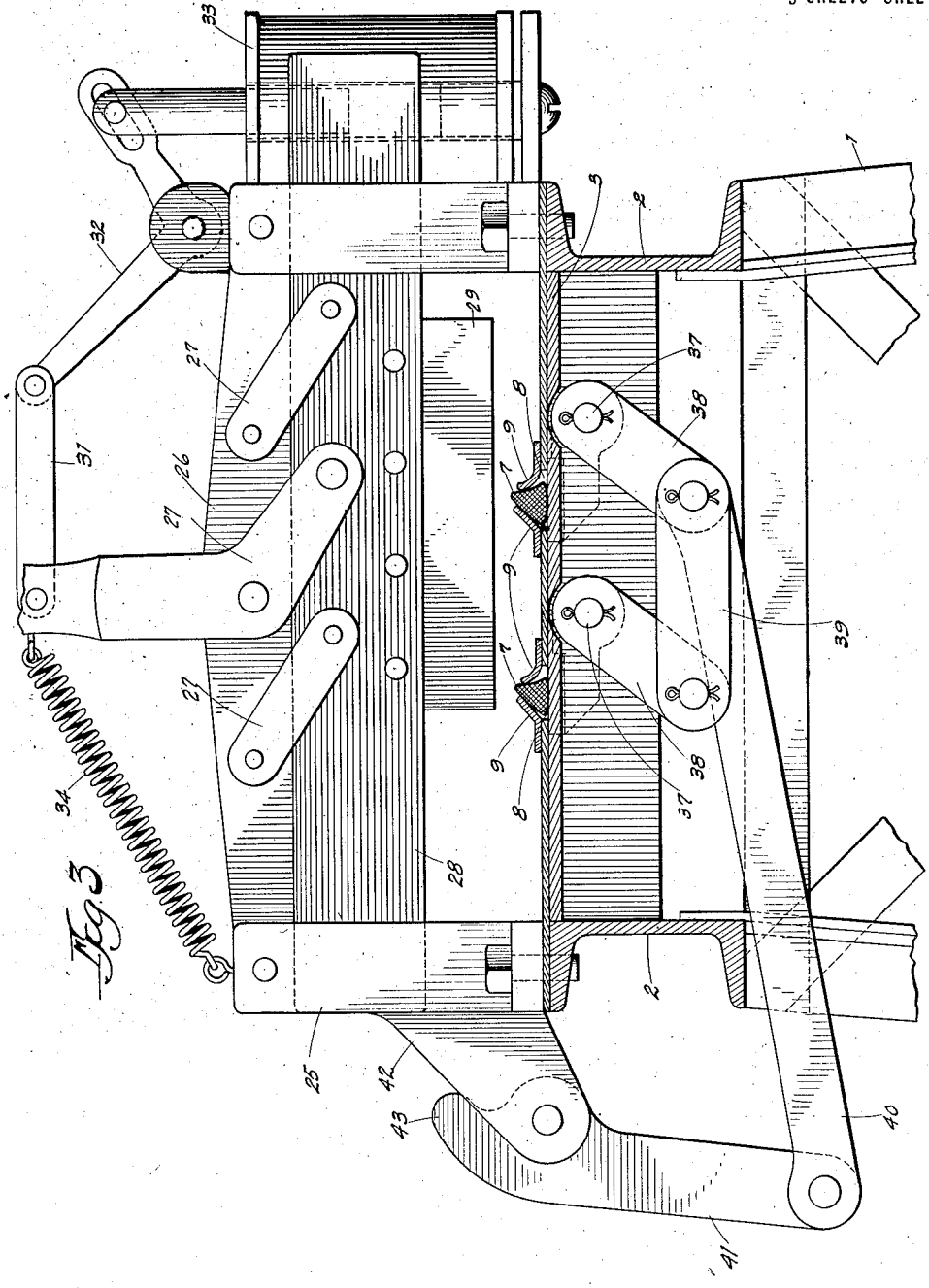

WILLIAM C. STEVENS AND EDWARD D. PUTT, OF AKRON, OHIO, ASSIGNORS TO THE FIRESTONE TIRE AND RUBBER COMPANY, OF AKRON, OHIO, A CORPORATION OF OHIO.

BEAD-CUT-OFF MACHINE.

1,407,712.  Specification of Letters Patent.  Patented Feb. 28, 1922.

Application filed May 21, 1918. Serial No. 235,847.

*To all whom it may concern:*

Be it known that we, WILLIAM C. STEVENS and EDWARD D. PUTT, citizens of the United States, residing at Akron, county of Summit, State of Ohio, have invented certain new and useful Improvements in Bead-Cut-Off Machines, of which the following is a specification.

In the manufacture of automobile tires, it is usual to form certain types of beads in continuous lengths from which the beads are cut to the correct length to be incorporated in the tire casing. This operation was formerly done by hand, and we have devised the machine shown herein to replace the hand operation and perform the work more rapidly and accurately.

In the drawings accompanying this application there is shown one embodiment of our invention, but we do not intend to be limited to the details therein shown, as the machine may be altered in many ways within the scope of the invention.

Fig. 1 is a plan view of the machine.

Fig. 2 is a longitudinal section through the machine along the line 2—2, Fig. 1.

Fig. 3 is an enlarged cross sectional view taken at the knife showing also the discharge mechanism.

Fig. 4 is a cross sectional view taken at the stop mechanism along the line 4—4, Fig. 1.

Fig. 5 is an enlarged detail of the stop.

Fig. 6 is diagrammatic of the electrical wiring.

Flexible beads of the character which this machine is designed to cut are usually extruded from a die and semicured in long lengths which are then cut to the proper length to go into the tire.

The machine for severing the beads is mounted on uprights 1 and provided with rails 2, and a table 3. On the front of the machine in mounted a bracket 4 upon which is carried a double reel 5 designed to carry two strips of bead material, although the number of strips may be increased or only one may be carried. On the ends of the side rail is rotatably mounted a guide roller 6 over which the strip of bead material 7 travels.

The upper surface of the table is provided with slots 8 in which the bead material is guided, the upper edges of the slots being covered with adjustable plates 9 which overhang the slot and confine the bead closely in the guide way.

On the underside of the frame work is mounted a shaft 10 provided at one end with a drive pulley 11 and centrally with a gear 12 in mesh with pinion 13 on shaft 14. This shaft carries feed pulleys 15 projecting into the slots 8 and serving to feed the bead into the machine. On the upper surface of the table is secured a bracket 16 on the upper end of which is pivoted an arm 17 carrying pressure rollers 18 directly over the feed rollers 15. The end of the arm passes over a pin 19, the upper end of which carries a turn button 20 between which and the end of the bracket is placed a spring 21. The pressure of the spring is so adjusted that sufficient pressure is exerted on the rollers to feed the bead forward if there is no resistance to its travel, but if the bead is held sufficiently, the feed roller will slip over the surface of the bead. On the far end of the table is secured a rod 22 on which is adjustably secured a slide 23, carrying two stop fingers 24, the operation of which will be explained.

Near the front of the machine is secured by uprights 25 a cross bar 26 on which is pivotally mounted a series of links 27 carrying cross head 28 to which is secured a knife 29 arranged to cooperate with a cutting surface 30 on the table under the beads. One of the links 27 is extended above the cross bar and is connected by a link 31 with a bell crank lever 32 operated by a solenoid 33 in a manner to be described. A spring 34 serves to raise the knife after each cutting operation.

Below each slot 8, between the knife and the stops, is arranged a drop plate 35 carried on arms 36 secured to rock shafts 37 carried by the frame of the machine. On the ends of shafts 37 are mounted arms 38 connected by a link 39 so that the shafts and drop plates will move in unison. A lever 40 is pivotally connected to one of the arms at one end and to a lever 41 at the other, which latter is in turn pivoted to a bracket 42 on the upright 25. The upper end of the lever 41 carries an ear 43 which is located in the path of the cross head 28 and is arranged so that on the completion of the cutting stroke the drop plates will lower and the severed beads will fall into a basket 44 secured to the under side of the table in position to catch them.

The shaft 10 and pulleys 15 are constantly rotating to feed the bead material into the machine, when, however, the end of the bead strikes the adjustable stop 24, it moves the stop over to strike a contact pin 45, which closes the circuit from a battery 46 to one of a pair of magnets 47. The magnet 47 when energized draws up on one end of a clamping lever 48 the other end of which quickly and firmly clamps the bead in front of the knife, the feed roller 15 revolving idly while the bead is clamped. When both beads have moved their stops 24 as described, a second circuit is established by the movable contacts 49 from the battery through the solenoid 33 and the knife is drawn down to cut the bead. As the knife finishes its cut, the left hand end, as shown in Fig. 3, strikes the ear 43 and lowers the plates 35 whereby the bead is discharged into the basket. All that the operator is required to do is to see that the beads are fed into the feed roller properly and to replenish the supply from time to time.

If desired, the solenoid 33 may be omitted and the knife operated by hand when the two beads have been fed inward to the stops 24. Other additions or alterations are possible within the skill of a mechanic to alter the machine without the exercise of invention and without changing the invention herein disclosed. Nor is the invention confined to cutting bead material, it being obvious that it is suited for severing other material with slight modifications.

We claim:

1. In a machine of the character set forth, a guideway to support the material to be cut, a stop at one end of the guideway, a knife at the other end of the guideway, means to operate the knife, a member movable to clamp the material, and means to operate said clamping member controlled by the stop.

2. In a machine of the character set forth, a continuously operating feeding device, a guideway for the material, a stop in the guideway, means for discontinuing the feeding of the material when it reaches the stop, a knife and means for operating the knife.

3. In a machine of the character set forth, a feeding roller, means for rotating the feeding roller, a guideway for the material, a stop in the guideway, means operated by the stop to arrest the movement of the material without stopping the rotation of the feeding rolls when it reaches the stop, a knife above the guideway, and means for operating the knife.

4. In a machine for cutting off flexible material in given lengths, a guideway for directing and confining the material, a stop located near one end of the guideway and a knife located near the other end thereof, a feed roller in the guideway in front of the knife, and mechanism for clamping the bead and arresting its movement when it reaches the stop.

5. In a machine for cutting off beads, a guideway for directing and confining the beads for longitudinal movement, a stop located near one end of the guideway, a knife located near the other end of the guideway, feeding mechanism for advancing the bead through the guideway, a clamping lever located adjacent the bead, and means operated by the stop to cause the clamp to arrest the movement of the bead.

6. In a machine for cutting off beads, a guideway for directing and confining the bead for longitudinal movement, a stop in and near one end of the guideway, a knife near the other end of the guideway, feeding mechanism for advancing the bead through the guideway, a clamping lever located adjacent the bead, a magnet for operating the clamping lever for arresting the movement of the bead, and a circuit closing device operable by the stop to energize the magnets.

7. In a machine for cutting bead material, a table having a slot to receive the material, plates secured to the table and overhanging the slot to confine the bead material therein, a stop at one end of the slot, a knife at the other end of the slot and means to feed the bead material through the slot.

8. In a machine of the character set forth, a guideway for directing and confining the bead, a stop located near one end of the guideway, a knife located near the other end of the guideway, feeding mechanism for advancing the bead through the guideway, a clamping lever located adjacent the bead, means operated by the stop to cause the clamp to arrest the movement of the bead, a movable bottom for the guideway, means to operate the knife and mechanism operable by the movement of the knife to lower the movable bottom.

9. In a machine for cutting bead material, a table having a slot to receive the material, plates secured to the table and overhanging the slot to confine the bead material therein, means to feed the material, a stop in the guideway, means operated by the stop to arrest the movement of the material without stopping the feeding means, a knife, and means for operating the knife to sever the bead material.

WILLIAM C. STEVENS.
EDWARD D. PUTT.